(12) United States Patent
Kitazawa

(10) Patent No.: US 8,163,666 B2
(45) Date of Patent: Apr. 24, 2012

(54) TAPHOLE MIX

(75) Inventor: Yutaka Kitazawa, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 33 days.

(21) Appl. No.: 12/446,278

(22) PCT Filed: Oct. 18, 2007

(86) PCT No.: PCT/JP2007/070349
§ 371 (c)(1),
(2), (4) Date: Aug. 11, 2010

(87) PCT Pub. No.: WO2008/047868
PCT Pub. Date: Apr. 24, 2008

(65) Prior Publication Data
US 2010/0304951 A1    Dec. 2, 2010

(30) Foreign Application Priority Data
Oct. 20, 2006  (JP) ................. 2006-286208

(51) Int. Cl.
*C04B 35/586* (2006.01)
*C04B 35/52* (2006.01)

(52) U.S. Cl. .............. 501/97.1; 501/100; 501/128

(58) Field of Classification Search ............ 501/100, 501/128, 97.1
See application file for complete search history.

(56) References Cited

U.S. PATENT DOCUMENTS
5,962,357 A * 10/1999 Kubota et al. ................ 501/99
6,257,466 B1 * 7/2001 Muroi et al. .................. 222/606
(Continued)

FOREIGN PATENT DOCUMENTS
JP    8231278 A    9/1996
(Continued)

OTHER PUBLICATIONS
International Search Report published Apr. 24, 2008 for PCT/JP2007/070349 filed Oct. 18, 2007.
(Continued)

*Primary Examiner* — Karl Group
(74) *Attorney, Agent, or Firm* — Martin Fleit; Paul D. Bianco; Fleit Gibbons Gutman Bongini & Bianco PL (57) ABSTRACT

It is intended to provide a taphole mix capable of forming SiC bonds with minimum of an excess and a deficiency in components thereof, and excellent in drillability. A fine particle fraction having a particle diameter of 75 μm or less is comprised of three components consisting of a silicon nitride-based material, a carbon-based material, and roseki, or comprised of the three component, and one or more selected from the group consisting of an alumina-based material, a silicon carbide-based material, a rare-earth element oxide-based material, clay, a high-purity silica-based material containing $SiO_2$ in an amount of 80 mass % or more, a boron compound-based material in an amount of less than 0.3 mass % with respect to 100 mass % of the silicon nitride-based material, and a metal powder in an amount of less than 10 mass % with respect to 100 mass % of the carbon-based material. Further, a total amount of 100 mass % of the three components in the fine particle range consists of 51 to 74 mass % of the silicon nitride-based material, 15 to 35 mass % of the carbon-based material, and 10 to 30 mass % of the roseki.

16 Claims, 1 Drawing Sheet

U.S. PATENT DOCUMENTS

| | | | |
|---|---|---|---|
| 6,281,266 B1 * | 8/2001 | Takeda et al. | 523/140 |
| 6,283,341 B1 * | 9/2001 | Muroi et al. | 222/606 |
| 6,533,146 B1 * | 3/2003 | Ando et al. | 222/606 |

FOREIGN PATENT DOCUMENTS

| | | |
|---|---|---|
| JP | 9132471 A | 5/1997 |
| JP | 2831311 B2 | 9/1998 |
| JP | 11199337 A | 7/1999 |
| JP | 2000319711 A | 11/2000 |
| JP | 2001335374 A | 12/2001 |
| JP | 2002060820 A | 2/2002 |
| JP | 2002255660 * | 9/2002 |
| JP | 2004010379 A | 1/2004 |
| JP | 2004010380 A | 1/2004 |
| JP | 2004035354 A | 2/2004 |

OTHER PUBLICATIONS

English translation of International Preliminary Report on Patentability published Apr. 22, 2009 for PCT/JP2007/070349 filed Oct. 18, 2007.

English translation of Written Opinion of the International Searching Authority published Apr. 20, 2009 for PCT/JP2007/070349 filed Oct. 18, 2007.

* cited by examiner

TAPHOLE MIX

TECHNICAL FIELD

The present invention relates to a taphole mix prepared by kneading with a binder a refractory powder size-controlled to include a fine particle fraction having a particle diameter of 75 μm or less.

BACKGROUND ART

A use mode of a taphole mix will be described by taking an operation of a blast furnace as an example. After completion of tapping, the taphole mix is pressingly inserted into and filled in a taphole to plug the taphole. When a time for next tapping using the taphole has come, the taphole mix burned by heat of the furnace during a preceding process is drilled to form a molten metal passage. Molten pig iron and molten slag within the furnace are discharged outside the furnace through the molten metal passage. In order to suppress a progressive increase in bore diameter of the molten metal passage during tapping so as to achieve stable tapping for a long time, the taphole mix is required to have excellent erosion/corrosion resistance to molten pig iron and molten slag.

Heretofore, it has been known that it is effective to add a silicon nitride-based material and a carbon-based (carbonaceous) material to a taphole mix in order to improve erosion/corrosion resistance of a taphole mix, as disclosed in the following Patent Document 1.

The Patent Document 1 describes that, when a taphole mix contains a silicon nitride-based material and a carbon-based material, an SiC bond is formed at about 1400° C. or more according to the following reaction formulas (1) and (2). The SiC bond densifies a matrix of the taphole mix and strengthens the matrix to improve erosion/corrosion resistance of the taphole mix.

$$Si_3N_4 \rightarrow 3Si + 2N_2 \quad (1)$$

$$Si + C \rightarrow SiC \quad (2)$$

Specifically, the Patent Document 1 discloses a taphole mix comprising: ferro silicon nitride having a particle diameter of 75 μm or less, as a silicon nitride-based material; coke having a particle diameter of 0.3 mm or less, and pitch pellets, as a carbon-based material; and roseki having a particle diameter of 0.3 mm or less, on condition that a total amount of 100 mass % of the three components consists of about 42 mass % of the silicon nitride-based material, about 26 mass % of the carbon-based material, and about 32 mass % of the roseki (see Inventive Example 1 and paragraph [0025] in the Patent Document 1).

Besides the above taphole mix, there have also been known the following taphole mixes as the type containing a silicon nitride-based material and a carbon-based material.

The following Patent Document 2 discloses a taphole mix comprising: ferro silicon nitride having a particle diameter of 74 μm or less; carbon black having a particle diameter of less than 1 μm; and microsilica having a particle diameter of less than 1 μm, on condition that a total amount of 100 mass % of the three components consists of about 42.8 mass % of the ferro silicon nitride, about 28.5 mass % of the carbon black, and about 28.5 mass % of the microsilica (see Inventive Example 3 in the Patent Document 2).

The Patent Document 2 also discloses a taphole mix comprising: ferro silicon nitride having a particle diameter of 74 μm or less; carbon black having a particle diameter of less than 1 μm; and microsilica having a particle diameter of less than 1 μm, and clay, as a silica-based (siliceous) material, on condition that a total amount of 100 mass % of the three components consists of about 43 mass % of the ferro silicon nitride, about 14 mass % of the carbon black, and about 43 mass % of the silica-based material (see Comparative Example 1-5 in the Patent Document 2).

The following Patent Document 3 discloses a taphole mix comprising: ferro silicon nitride having a particle diameter of 0.5 mm or less; coke having a particle diameter of 2 mm or less; and an ultrafine roseki powder having an average particle diameter of 4 μm, on condition that a total amount of 100 mass % of the three components consists of 40 mass % of the ferro silicon nitride, 40 mass % of the coke, and 20 mass % of the ultrafine roseki powder (see Inventive Example 4 in the Patent Document 3).

The following Patent Document 4 discloses a taphole mix comprising: ferro silicon nitride controlled to have a particle size of 200 mesh or less, i.e., a particle diameter of about 75 μm or less; graphite controlled to have a particle size of 200 mesh or less; and roseki having a particle diameter of 0.1 mm or less, on condition that a total amount of 100 mass % of the three components consists of 50 mass % of the ferro silicon nitride, 17 mass % of the graphite, and 33.5 mass % of the roseki (see Inventive Example D in the Patent Document 4).

The following Patent Document 5 discloses a taphole mix comprising: ferro silicon nitride having a particle diameter of 45 μm or less; carbon black; and roseki having a particle diameter of 0.1 mm or less, on condition that a total amount of 100 mass % of the three components consists of 55.5 mass % of the ferro silicon nitride, 11.1 mass % of the carbon black, and 33.3 mass % of the roseki (see Inventive Examples 1 to 3 in the Patent Document 5).

The following Patent Document 6 discloses a taphole mix comprising: ferro silicon nitride having a particle diameter of 0.1 mm or less; carbon black; and roseki having a particle diameter of 0.1 mm or less, on condition that a total amount of 100 mass % of the three components consists of 71.4 mass % of the ferro silicon nitride, 4 mass % of the carbon black, and 23.8 mass % of the roseki (see Comparative Examples 3 to 7 in the Patent Document 6).

The following Patent Document 7 discloses a taphole mix comprising: ferro silicon nitride having a particle diameter of 75 μm or less; carbon black; and roseki having a particle diameter of 0.1 mm or less, on condition that a total amount of 100 mass % of the three components consists of 50 mass % of the ferro silicon nitride, 27.8 mass % of the carbon black, and 22.2 mass % of the roseki (see Sample No. 7 in Table 1 in the Patent Document 7).

| | |
|---|---|
| [Patent Document 1] | JP 2831311B |
| [Patent Document 2] | JP 2002-60820A |
| [Patent Document 3] | JP 2000-319711A |
| [Patent Document 4] | JP 08-231278A |
| [Patent Document 5] | JP 2004-10379A |
| [Patent Document 6] | JP 2001-335374A |
| [Patent Document 7] | JP 11-199337A |

DISCLOSURE OF THE INVENTION

Problem to be Solved by the Invention

The reaction formulas (1) and (2) described in the Patent Document 1 are correct in theory. However, according to researches of the inventor of this application, it was proven that an SiC bond is hardly formed unless a silica component exists in a fine particle fraction having a particle diameter of 75 μm or less, which constitutes a matrix of a taphole mix, as well as a silicon nitride-based material and a carbon-based material. It was also proven that a type of material serving as a source of the silica component, a particle size of each of the silicon nitride-based material, the carbon-based material and the material serving as a source of the silica component, and a relative ratio among the three components, become key factors in forming an SiC bond.

The taphole mix in the Inventive Example 3 in the Patent Document 2 contains a material serving as a silica-component source, in the fine particle fraction. However, the material serving as a silica-component source consists only of microsilica. Microsilica is transformed into SiO gas in a temperature range of about 1400° C. and scattered through a matrix of a taphole mix in a direction from an inside to a surface layer thereof, so that it is unable to form a sufficient number of SiC bonds within the taphole mix. This problem is likely to occur not only in microsilica but also when using a high-purity silica-based material containing $SiO_2$ in an amount of 80 mass % or more, such as silica stone, or anhydrous or aqueous amorphous silica including fused silica, silica flour and white carbon.

The taphole mix in the Comparative Example 1-5 in the Patent Document 2 contains a material serving as a silica-component source, in the fine particle fraction. However, the material serving as a silica-component source consists only of microsilica and clay. Although clay is insusceptible to gasification as compared with the high-purity silica-based material, it has a property of shrinking during burning, supposably due to a relatively large amount of crystallization water contained therein. This is likely to lead to degradation in matrix of a taphole mix. Therefore, even if SiC bonds can be formed, there is difficulty in fully bringing out a matrix-strengthening effect based on the SiC bonds.

As a result of researches by the inventor of this application, it has been found that it is necessary to use roseki as a material serving as a silica-component source in order to allow for adequate formation of SiC bonds, and thoroughly bring out a matrix-strengthening effect based the formation of SiC bonds.

The taphole mix in the Patent Document 1 contains roseki as a material serving as a silica-component source. Based on the use of roseki, the above problem occurring when using a high-purity silica-based material and clay is reduced. However, in the Patent Document 1, due to inadequacy in particle size of each of the roseki and the carbon-based material (coke), it is unable to efficiently form SiC bonds. Moreover, due to an excessively small relative ratio of the ferro silicon nitride to each of the carbon-based material and the roseki, a loss, i.e., a wasted part incapable of contributing to formation of SiC bonds, will arise in at least one of the carbon-based material and the roseki.

The taphole mix in the Patent Document 3 also contains roseki as a material serving as a silica-component source. However, due to inadequacy in particle size of each of the ferro silicon nitride and the coke, it is unable to efficiently form SiC bonds. Moreover, due to an excessively small relative ratio of the ferro silicon nitride to each of the carbon-based material and the roseki, a loss, i.e., a wasted part incapable of contributing to formation of SiC bonds, will arise in at least one of the carbon-based material and the roseki.

According to researches by the inventor of this application, SiC bonds are formed through a reaction among the three components consisting of a silicon nitride-based material, a carbon-based material and roseki, and, if a particle size of each of the three components and a relative ratio among the three components are not adequate as described above, an excess and a deficiency will occur in the three components to preclude efficient formation of SiC bonds.

If a technique capable of forming SiC bonds while minimizing an excess and a deficiency in the three components is achieved, it makes it possible to form a greater number of SiC bonds than ever before even under the same condition for a total amount of the three components, so as to improve erosion/corrosion resistance of a taphole mix. In addition, the technique has an advantage of being able to reduce a total amount of the three components to be used for obtaining a target number of SiC bonds, so as to prevent an increase in cost of a taphole mix, and provide flexibility to design for a composition of a taphole mix other than the three components.

However, heretofore, it has not been considered to form SiC bonds while minimizing an excess and a deficiency in the three components. Although a taphole mix containing a combination of the three components has been known, there is not any conventional taphole mix prepared by adequately combining a particle size of each of the three components and a relative ratio among the three components, supposably because previous inventors have not reached the knowledge that SiC bonds can be formed only by the combination of the three components.

A taphole mix is also required to have drillability. The term "drillability" means ease of drilling during an operation of drilling a taphole mix burned by heat of a furnace to form a hole therein. Bonds, such as SiC bonds, improve erosion/corrosion resistance of a taphole mix. However, if such bonds have already been formed before the drilling operation, drillability of the taphole mix will deteriorate. Thus, it is desirable that almost no bond is formed in a state when a taphole mix is set to plug a taphole, i.e., when a temperature of the taphole mix is about 1200° C. or less, whereas bonds are formed at a timing when the temperature of the taphole mix reaches 1400° C. or more by contact with molten pig iron and molten slag after the drilling operation.

From this point of view, in the taphole mixes in the Patent Documents 4 to 7, there remains a need for further improvements in not only efficient formation of SiC bonds but also drillability, as described below.

The taphole mix in the Patent Document 4 is incapable of efficiently forming SiC bonds due to inadequacy in particle size of the roseki and in relative ratio among the three components. Moreover, boron carbide included in the fine particle fraction reacts with the ferro silicon nitride in priority to an SiC bond-formation reaction among the three components, to undesirably form boron nitride bonds in a low-temperature range of 1200° C. or less. Consequently, drillability will deteriorate. This is a problem which is likely to commonly occur in a taphole mix using a boron compound.

The taphole mix in each of the Patent Documents 5 and 6 is incapable of efficiently forming SiC bonds due to inadequacy in particle size of the roseki, and obtaining adequate drillability due to an excessively small relative ratio of the carbon-based material. Specifically, a carbon-based material plays serves as not only a source of a C component for forming SiC bonds but also a means to suppress a silicon oxynitride bond-formation reaction between roseki and a silicon nitride-based material in a low-temperature range of about 1200° C. or less. Thus, if a relative ratio of the carbon-based material is small, the formation of silicon oxynitride bonds is initiated in the low-temperature range of about 1200° C. or less to cause deterioration in drillability.

The taphole mix in the Patent Document 7 is incapable of efficiently forming SiC bonds due to inadequacy in particle size of the roseki. Moreover, metal silicon included in the fine particle fraction reacts with the carbon-based material in priority to an SiC bond-formation reaction among the three components, to undesirably form carbide bonds (in this case, SiC bonds) in a low-temperature range of 1200° C. or less. Consequently, drillability will deteriorate. This is a problem which is likely to commonly occur in a taphole mix using a metal powder.

It is an object of the present invention to provide a taphole mix capable of forming SiC bonds with minimum of an excess and a deficiency in components thereof, and excellent in drillability.

Means for Solving the Problem

According to one aspect of the present invention, there is provided a taphole mix which is prepared by kneading with a binder a refractory powder size-controlled to include a fine particle fraction having a particle diameter of 75 μm or less. In the taphole mix, the fine particle fraction is comprised of three components consisting of a silicon nitride-based material, a carbon-based material, and roseki, or comprised of the three component, and one or more selected from the group consisting of an alumina-based material, a silicon carbide-based material, a rare-earth element oxide-based material, clay, a high-purity silica-based material containing $SiO_2$ in an amount of 80 mass % or more, a boron compound-based material in an amount of less than 0.3 mass % with respect to 100 mass % of the silicon nitride-based material, and a metal powder in an amount of less than 10 mass % with respect to 100 mass % of the carbon-based material. Further, a total amount of 100 mass % of the three components in the fine particle range consists of 51 to 74 mass % of the silicon nitride-based material, 15 to 35 mass % of the carbon-based material, and 10 to 30 mass % of the roseki.

As used in this specification, a term expressed as a chemical formula, such as $Si_3N_4$, means a chemical composition, and a material expressed as "X-based material", such as a silicon nitride-based material or a carbon-based material, means an actual refractory material containing an inevitable impurity. As used in this specification, the term "X to Y" expressing a numerical range includes the lower and upper limit values X, Y.

When a particle size range of each of the silicon nitride-based material, the carbon-based material and the roseki to be mixed together, and a relative ratio among the three components, are set as above, an excess and a deficiency in the three components during an SiC bond-formation reaction can be suppressed. This makes it possible to form a larger number of SiC bonds than ever before even under the same condition for a total amount of the three components, so as to obtain a taphole mix excellent in erosion/corrosion resistance. Further, a lower limit of the relative ratio of the carbon-based material to the three components is set as above. This makes it possible to prevent silicon oxynitride bonds from being formed between the silicon nitride-based material and the roseki before a drilling operation so as to avoid deterioration in drillability.

Even if the alumina-based material, the silicon carbide-based material and the rare-earth element oxide-based material are used in combination with the three components, undesirable bonds hindering the drillability are less likely to be formed, because they are mostly not involved in the SiC bond-formation reaction among the three components. Similarly, even if the clay and the high-purity silica-based material are used in combination with the three components, it is possible to achieve a taphole mix which is less likely to form undesirable bonds hindering the drillability. The aforementioned problem occurring when using clay or a high-purity silica-based material is reduced by using the roseki. Even if each of the boron compound-based material and the metal power is used, the formation of undesirable bonds hindering the drillability can be avoided by restricting a mixing amount thereof. In the above manner, a taphole mix additionally having adequate drillability can be obtained.

BEST MODE FOR CARRYING OUT THE INVENTION

Figure 1:
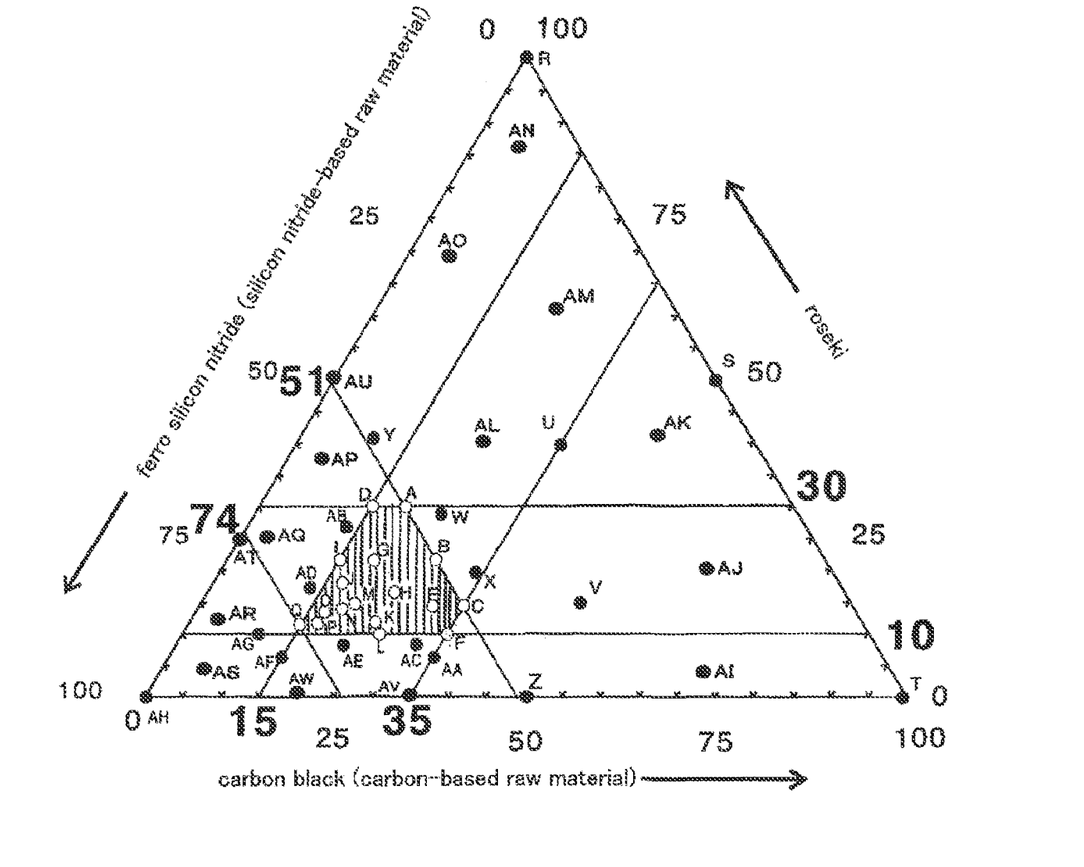
The FIGURE depicts a triangular diagram which plots respective mixing ratios of a silicon nitride-based material, a carbon-based material and roseki in a mixed powder

The present invention will now be described based on one embodiment thereof.

With a view to allow a crystal structure to be close to a closest packed structure while obtaining excellent operating efficiency and others, a refractory powder constituting a taphole mix is size-controlled, for example, such that it comprises 45 to 75 mass % of a fine particle fraction having a particle diameter of 75 μm or less, and 5 to 25 mass % of a coarse particle fraction having a particle diameter of greater than 1 mm, with the remainder being a medium particle fraction having a particle diameter of greater than 75 μm to 1 mm, as measured using a standard sieve defined in JIS-Z8801.

In the refractory powder, the fine particle fraction having a particle diameter of 75 μm or less is formed to include at least a silicon nitride-based material, a carbon-based material, and roseki. The three components constituting the fine particle fraction react with each other to form SiC bonds.

Although a silicon nitride-based material, a carbon-based material or roseki may be included in not only the fine particle fraction but also the medium or coarse particle fraction having a particle diameter of greater than 75 μm, each of the silicon nitride-based material, the carbon-based material and the roseki having a particle diameter of greater than 75 μm is mostly not involved in formation of bonds due to a coarse particle size thereof.

In the following description, each of the terms "silicon nitride-based material", "carbon-based material" and "roseki" means a component constituting the fine particle fraction, unless otherwise stated. Further, the term "the three components" means three components consisting of a silicon nitride-based material, a carbon-based material and roseki which constitute the fine particle fraction.

From the standpoint of facilitating an SiC bond-forming reaction to further increase the number of SiC bonds to be formed, each of the three components is preferably size-controlled such that an average particle diameter thereof is 20 μm or less, and 85 mass % or more thereof belongs to a particle fraction having a particle diameter of 45 μm or less, as measured using a standard sieve defined in JIS-Z8801. In this case, most of the three components do not exist in a particle fraction having a particle diameter of greater than 45 μm to 75 μm in the fine particle fraction. More preferably, each of the three components has an average particle diameter of 15 μm or less.

As used in this specification, the term "average particle diameter" means a volume-based average particle size corresponding to a central cumulative value of a cumulative curve (a graph plotted based on a horizontal axis representing a particle diameter and a vertical axis representing a cumulative frequency) measured by a laser diffraction scattering-type particle size distribution analyzer.

From the standpoint of suppressing the occurrence of an excess and a deficiency in the three components during the SiC bond-formation reaction, it is essential that a total amount of 100 mass % of the three components consists of 51 to 74 mass % of the silicon nitride-based material, 15 to 35 mass % of the carbon-based material, and 10 to 30 mass % of the roseki.

If the relative ratio of the silicon nitride-based material is greater than 74 mass %, a loss, i.e., a wasted part incapable of contributing to the SiC bond-formation reaction, will arise in the silicon nitride-based material. If the relative ratio of the silicon nitride-based material is less than 51 mass %, a loss, i.e., a wasted part incapable of contributing to the SiC bond-formation reaction, will arise in at least one of the carbon-based material and the roseki.

If the relative ratio of the carbon-based material is greater than 35 mass %, a loss, i.e., a wasted part incapable of contributing to the SiC bond-formation reaction, will arise in the carbon-based material, and a strength of a taphole mix will be lowered due to an excessive amount of C component, which is likely to cause deterioration in erosion/corrosion resistance of the taphole mix. If the relative ratio of the carbon-based material is less than 15 mass %, a loss, i.e., a wasted part incapable of contributing to the SiC bond-formation reaction, will arise in at least one of the silicon nitride-based material and the roseki, and the number of silicon oxynitride bonds to be formed at a temperature (e.g., about 1200° C.) of a taphole mix in a state when it is set to plug a taphole before a drilling operation, according to the following reaction formula (3), will be increased to cause deterioration in drillability of the taphole mix:

$$Si_3N_4 + SiO_2 \rightarrow 2Si_2ON_2 \qquad (3)$$

If the relative ratio of the roseki is greater than 30 mass %, a loss, i.e., a wasted part incapable of contributing to the SiC bond-formation reaction, will arise in the roseki, and an $SiO_2$ component will be excessively increased, which is likely to cause deterioration in erosion/corrosion resistance of a taphole mix. If the relative ratio of the roseki is less than 10 mass %, a loss, i.e., a wasted part incapable of contributing to the SiC bond-formation reaction, will arise in at least one of the silicon nitride-based material and the carbon-based material.

A material usable as the silicon nitride-based material may be, for example, one or more selected from silicon nitride and ferro silicon nitride. Among them, ferro silicon nitride is preferable. The reason is that a Fe component in ferro silicon nitride promotes the SiC bond-formation reaction. However, if a content of Fe component in ferro silicon nitride is excessively large, a reaction promoting effect becomes excessive, which is likely to cause a reduction in number of SiC bonds to be formed. Thus, ferro silicon nitride preferably consists of 70 mass % or more of $SiO_3N_4$, with the remainder being primarily Fe.

A material usable as the carbon-based material may be, for example, one or more selected from the group consisting of: carbon black, such as thermal black, acetylene black, channel black, lamp black, furnace black or Ketjen black; graphite, such as earthy (amorphous) graphite or flaky graphite; petroleum coke; coal coke; and anthracite coal. Among them, a carbon-based material having a C purity of 80 mass % or more is preferable. In terms of an ability to facilitate the Sic bond-formation reaction and suppress an amount of binder to be added to obtain desired operating efficiency, carbon black is preferable.

The roseki is a mineral ore having relatively high flexibility and rich waxy fat feeling. The roseki has a mineral composition which comprises a primary component consisting of pyrophyllite, and coexisting components, such as quarts, kaolin, sericite and diaspore. The roseki also has a chemical composition which comprises: a primary component consisting of $Al_2O_3$ and $SiO_2$; an alkaline component consisting of $K_2O$ and $Na_2O$; $TiO_2$; and $Fe_2O_3$. The roseki is referred to as "soap rock" or "steatite" in China, or referred to as "agalmatolite" in Europe and the United States.

Although a specific mechanism about why SiC bonds are adequately formed when using roseki is not clear, it is believed that roseki moderately containing $Al_2O_3$ is less likely to be dissipated as compared with a high-purity silica-based material, and at least this property contributes to formation of SiC bonds. Further, while an alumina-silica based material consisting primarily of $Al_2O_3$ and $SiO_2$ includes not only roseki but also other materials, such as mullite and chamotte, it has been verified that, among them, the use of roseki is particularly effective to adequately form SiC bonds. Therefore, in the present invention, roseki is used as an alumina-silica based material constituting the fine particle fraction.

Differently from clay minerals, such as kaolin clay, roseki exhibits expansibility in a hot state and thereby has no risk of causing degradation in matrix due to shrinkage. Thus, roseki makes it possible to thoroughly bring out a matrix strengthening effect based on formation of SiC bonds. In addition, a synergistic effect of improving plasticity of a taphole mix can also be obtained, supposably because roseki is clay mineral.

As the roseki, it is preferable to use a type containing $Al_2O_3$ in an amount of 8 to 17 mass %, as measured by the fluorescent X-ray analytical procedure defined in JIS-R2216, with the remainder being primarily $SiO_2$.

Table 1 shows examples of a chemical composition of roseki.

TABLE 1

|  | $SiO_2$ | $TiO_2$ | $Al_2O_3$ | $Fe_2O_3$ | $Na_2O$ | $K_2O$ |
|---|---|---|---|---|---|---|
| roseki A | 79.04 | 0.62 | 16.68 | 0.20 | 0.11 | 0.07 |
| roseki B | 83.93 | 0.22 | 12.04 | 0.79 | 0.10 | 0.93 |
| roseki C | 89.26 | 0.31 | 8.10 | 0.09 | 0.05 | 0.02 |
| roseki D | 80.48 | 0.27 | 15.38 | 0.57 | 0.06 | 0.55 |
| roseki E | 89.33 | 0.29 | 8.63 | 0.21 | 0.04 | 0.07 |

The number of SiC bonds to be formed in a matrix of a taphole mix varies depending on a use environment of the taphole mix. From the standpoint of allowing an appropriate number of SiC bonds to be formed, a mixing amount of the silicon nitride-based material constituting the fine particle fraction is preferably set, for example, in the range of about 20 to 50 mass %, in terms of a ratio occupied in the refractory powder. In this case, a total amount of the three components constituting the fine particle fraction is, for example, in the range of about 27 to 68 mass %, in terms of a ratio occupied in the refractory powder.

In this embodiment, a relative ratio among the three components is specified to allow SiC bonds to be formed without a waste in the three components, so that a total amount of the three components required for obtaining a desired number of SiC bonds can be reduced. This provides enhanced flexibility to design for a composition of the remainder of the fine particle fraction other than the three components.

However, a material for the remainder of the fine particle fraction other than the three components is limited to one or more selected from the group consisting of an alumina-based material, a silicon carbide-based material, a rare-earth element oxide-based material, clay, a high-purity silica-based material, a boron compound-based material in an amount of less than 0.3 mass % with respect to 100 mass % of the silicon nitride-based material, and a metal powder in an amount of less than 10 mass % with respect to 100 mass % of the carbon-based material.

A material usable as the alumina-based material may be a material containing $Al_2O_3$ in an amount of 50 mass % or more, for example, one or more selected from the group consisting of bauxite, calcinated alumina, sintered alumina and fused alumina.

A material usable as the rare-earth element oxide-based material may be, for example, one or more selected from the group consisting of an yttrium oxide-based material, a lanthanum oxide-based material and a cerium oxide-based material.

A material usable as the high-purity silica-based material may be, for example, one or more selected from the group consisting of microsilica, fused silica, silica flour, white carbon and silica stone.

A material usable as the boron compound-based material may be, for example, one or more selected from a boron carbide-based material and a boron nitride-based material A material usable as the metal powder may be, for example, an aluminum powder, a metal silicon powder and a ferro silicon powder.

Each of the alumina-based material, the silicon carbide-based material and the rare-earth element oxide-based material is mostly not involved in the SiC bond-formation reaction among the three components, and therefore, even if they are used in combination with the three components, undesirable bonds hindering the drillability are less likely to be formed.

Similarly, even if the clay and the high-purity silica-based material are used in combination with the three components, it is possible to achieve a taphole mix which is less likely to form undesirable bonds hindering the drillability. Clay exhibits shrinkage behavior in a hot state. However, as long as clay is used in combination with roseki which exhibits expansion behavior in a hot state, degradation in matrix of a taphole mix due to the shrinkage of the clay can be suppressed to obtain an effect from addition of the clay, i.e., an effect of being able to improve plasticity of the taphole mix, without degradation in matrix of the taphole mix. From the standpoint of more reliably preventing the negative effect due to the shrinkage of the clay, the clay is mixed preferably in an amount of less than 60 mass %, more preferably in an amount of less than 40 mass %, most preferably in an amount of zero mass %, with respect to 100 mass % of the roseki. Further, from the standpoint of further enhancing the drillability of a taphole mix, the high-purity silica-based material is mixed preferably in an amount of less than 7 mass %, more preferably in an amount of zero mass %, with respect to 100 mass % of the silicon nitride-based material.

Even if each of the boron compound-based material and the metal powder is used, the formation of undesirable bonds hindering the drillability can be avoided by restricting a mixing amount thereof as described above. In the above manner, a taphole mix additionally having adequate drillability can be obtained.

The medium and coarse particle fractions of the refractory powder may be formed, for example, by one or more selected from the group consisting of: an alumina-silica based material, such as roseki, mullite, kaolin, chamotte, sericite, sillimanite, kyanite or andalusite; an alumina-based material, such as bauxite, diaspore, shale, fused alumina, sintered alumina, calcined alumina, sintered spinel or fused spinel; silica stone; zircon; zirconia; magnesia; chromium steel; dolomite clinker; lime; and pellet.

A taphole mix is obtained by kneading the above refractory powder with a binder. The binder may include tar and resin. The tar may include coal tar, petroleum tar, wood tar, shale tar, asphalt and pitch. The resin may include novolac-type or resol-type phenolic resin and furan resin. When the resin, particularly a novolac-type phenolic resin having thermoplasticity, is used, a curing agent, such as hexamethylenetetramine, is preferably used in combination therewith. Further, the tar and the resin may be used together.

For example, the binder is added preferably in an amount of 10 to 20 mass %, more preferably in an amount of 12 to 17 mass %, with respect to and in addition to 100 mass % of the refractory powder. An amount of residual carbon components contained in the binder is, for example, in the range of about 20 to 30 mass %, and a residual carbon of the binder mostly does not contribute to formation of SiC bonds.

In this specification, the term "taphole mix prepared by kneading the refractory powder with the binder" is used as a concept including a taphole mix prepared by kneading the refractory powder with the binder after an additive for function adjustment is added to the refractory powder according to need. A material usable as the additive may be, for example, a dispersant and a strength-improving material. The dispersant may include, for example, anionic sulfonate, specifically β-naphthalenesulfonate, anionic alkyl aryl sulfonate, and anionic modified lignin sulfonate. The dispersant can be used for promoting dispersibility in the fine particle fraction. The strength-improving material may include inorganic fiber, such as carbon fiber and glass fiber. The strength-improving material can be used for improving the strength of the taphole mix.

A function of the taphole mix according to this embodiment is as follows.

The taphole mix according to this embodiment is first pressingly inserted into and filled in a taphole of a blast furnace after completion of tapping, and, in this state, burned by heat of the furnace in a period until next tapping using the taphole. In a state when the taphole mix is set to plug the taphole, a portion of the taphole mix located adjacent to an inside of the furnace is kept at a temperature of about 1000 to 1200° C. A relative ratio among the three components is specified, and the component of the fine particle fraction other than the three components is restricted, as mentioned above, so that, formation of undesirable bonds, such as silicon oxynitride bonds, in this temperature range, can be suppressed. This makes it possible to prevent a matrix of the taphole mix from becoming excessively hardened in the state when the taphole mix is set to plug the taphole.

Then, when a time for the next tapping using the taphole has come, the taphole mix solidified in the taphole is drilled to form a molten metal passage. The taphole mix has excellent drillability, because it can be kept from becoming excessively hardened in the filled state, as mentioned above. In addition, the matrix of the taphole mix in the filled state can be kept from becoming excessively hardened and thereby becoming brittle. This also makes it possible to prevent the occurrence of crack in the taphole mix during the drilling so as to facilitate a drilling operation.

Then, when molten pig iron and molten slag flow through the molten metal passage formed in the taphole mix, the temperature of the taphole mix is increased up to about 1450 to 1550° C. In a temperature range of 1400° C. or more, the silicon nitride-based material is decomposed while releasing $N_2$, and reacts with C supplied from the carbon-based material and $SiO_2$ supplied from the roseki to form SiC bonds. This makes it possible to improve erosion/corrosion resistance of the taphole mix so as to facilitate extending a tapping time and enhancing a furnace-wall protection effect.

As above, the taphole mix according to this embodiment does not exhibit excessive strength before being drilled, but it exhibits sufficient strength after being drilled.

EXAMPLE

The following test was carried out to check a relationship between a relative ratio among the silicon nitride-based material, the carbon-based material and the roseki, and each of an SiC-bond formation rate and an erosion/corrosion resistance.

A mixed powder consisting of ferro silicon nitride, carbon black, and roseki (roseki A containing $Al_2O_3$ in an amount of 15 mass % or more, as shown in Table 1) was first prepared. The ferro silicon nitride was formed using a ferro silicon nitride powder size-controlled such that an average particle diameter thereof is in the range of 8 to 10 μm, and 90 mass % thereof belongs to a particle fraction having a particle diameter of 45 μm or less. The carbon black was formed using a carbon black powder size-controlled such that an average particle diameter thereof is 0.1 μm or less, and an entire amount thereof belongs to a particle fraction having a particle diameter of 45 μm or less. The roseki was formed using a roseki powder size-controlled such that an average particle diameter thereof is in the range of 6 to 14 μm, and 90 mass % or more thereof belongs to a particle fraction having a particle diameter of 45 μm or less.

Then, the mixed powder was kneaded with an aqueous solution of acacia (concentration: 10%) added thereto in an amount of 15 mass % with respect to and in addition to 100 mass % of the mixed powder, and an obtained kneaded powder was subjected to pressure forming at 7 MPa, whereafter an obtained compact was dried at 110° C. for 24 hours to obtain a dried compact. The dried compact was burned at 1500° C. for 3 hours in a reduction atmosphere simulating an atmosphere within a taphole of an actual blast furnace, to obtain a burned body. This burned body was used as a sample.

In this case, a relative ratio among the three components constituting the mixed powder was variously changed to a plurality of types of samples, and measurements on the SiC formation rate and the erosion/corrosion resistance were performed for each of the samples.

Representative examples in results of the test are shown in Tables 2 to 4.

The SiC formation rate means a ratio of a mass of SiC components in the sample to a total mass of the sample. A value of the SiC formation rate was measured by the fluorescent X-ray analytical procedure defined in JIS-R2216.

A wear index means a value obtained as follows. Each of the samples is eroded/corroded using blast-furnace slag as an erosive/corrosive agent at 1500° C. for 6 hours by a rotary erosion/corrosion tester, and a maximum dimension of wear is measured. Then, the maximum wear dimension of each of the samples is divided by the maximum wear dimension of the sample A, and an obtained quotient is multiplied by 100 to obtain the wear index. The wear index indicates better erosion/corrosion resistance as a value thereof becomes smaller.

TABLE 2

| | | A | B | C | D | E | F | G | H | I | J | K | L | M | N | O | P | Q |
|---|---|---|---|---|---|---|---|---|---|---|---|---|---|---|---|---|---|---|
| Mixing Ratio | ferro silicon nitride | 51 | 51 | 51 | 55 | 55 | 55 | 59 | 59 | 63 | 63 | 64 | 65 | 65 | 67 | 70 | 72 | 74 |
| | carbon black | 19 | 27 | 35 | 15 | 30 | 35 | 19 | 25 | 15 | 25 | 26 | 16 | 20 | 19 | 17 | 16 | 15 |
| | roseki | 30 | 22 | 14 | 30 | 15 | 10 | 22 | 16 | 22 | 12 | 10 | 19 | 15 | 14 | 13 | 12 | 11 |
| Test Result | SiC formation rate [%] | 35.2 | 35.2 | 35.0 | 37.3 | 37.7 | 35.8 | 40.8 | 40.4 | 37.2 | 41.2 | 35.1 | 39.7 | 43.7 | 44.4 | 45.4 | 41.8 | 38.2 |
| | wear index | 100 | 100 | 97 | 93 | 94 | 98 | 83 | 85 | 95 | 82 | 95 | 88 | 79 | 79 | 77 | 82 | 92 |

TABLE 3

| | | R | S | T | U | V | W | X | Y | Z | AA | AB | AC | AD | AE | AF | AG | AH |
|---|---|---|---|---|---|---|---|---|---|---|---|---|---|---|---|---|---|---|
| Mixing Ratio | ferro silicon nitride | 0 | 0 | 0 | 25 | 35 | 47 | 47 | 50 | 50 | 58 | 60 | 60 | 70 | 70 | 78 | 80 | 100 |
| | carbon black | 0 | 50 | 100 | 35 | 50 | 33 | 24 | 10 | 50 | 35 | 13 | 32 | 13 | 22 | 15 | 10 | 0 |
| | roseki | 100 | 50 | 0 | 40 | 15 | 20 | 29 | 40 | 0 | 7 | 27 | 8 | 17 | 8 | 7 | 10 | 0 |
| Test Result | SiC formation rate [%] | 0.0 | 0.0 | 0.0 | 17.1 | 24.2 | 32.5 | 32.4 | 24.6 | 0.0 | 23.0 | 32.1 | 27.3 | 31.8 | 25.8 | 20.5 | 24.4 | 0.0 |
| | wear index | 285 | 250 | 183 | 150 | 133 | 107 | 108 | 128 | 171 | 135 | 108 | 118 | 110 | 130 | 143 | 126 | 154 |

TABLE 4

| | | AI | AJ | AK | AL | AM | AN | AO | AP | AQ | AR | AS | AT | AU | AV | AW |
|---|---|---|---|---|---|---|---|---|---|---|---|---|---|---|---|---|
| Mixing Ratio | ferro silicon nitride | 24 | 17 | 12 | 30 | 16 | 10 | 25 | 58 | 72 | 82 | 90 | 75 | 50 | 65 | 80 |
| | carbon black | 73 | 63 | 47 | 25 | 23 | 5 | 7 | 6 | 5 | 3 | 5 | 0 | 0 | 35 | 20 |
| | roseki | 3 | 20 | 41 | 45 | 61 | 85 | 68 | 36 | 23 | 15 | 5 | 25 | 50 | 0 | 0 |
| Test Result | SiC formation rate [%] | 9.9 | 11.7 | 8.1 | 20.5 | 10.7 | 6.5 | 16.9 | 14.0 | 11.0 | 5.6 | 10.4 | 0.0 | 0.0 | 0.2 | 0.1 |
| | wear index | 203 | 199 | 225 | 165 | 237 | 263 | 234 | 162 | 134 | 139 | 128 | 155 | 183 | 180 | 163 |

Each of the sample A to Q in Table 2 has a SiC formation rate of 35% or more and a wear index of 100 or less, which is superior in the SiC formation rate and the erosion/corrosion resistance to the samples R to AH in Table 3 and the samples AI to AW in Table 4. In view of this result, it is considered that conditions of respective mixing ratios of the samples A to Q are preferable.

The FIGURE depicts a triangular diagram which plots respective mixing ratios of the samples A to AW. The base, the left oblique side and the right oblique side of the triangular diagram represent a mixing ratio of carbon black, a mixing ratio of ferro silicon nitride, and a mixing ratio of roseki, respectively. The codes A to AW assigned to respective ones of the plots correspond to the codes A to AW in Tables 2 to 4. Each of the mixing ratios concerning the samples A to Q is plotted by a white circle, and each of the mixing ratios concerning the samples R to AW is plotted by a black circle.

The plots of the samples A to Q (in Table 2) exhibiting the excellent characteristics are distributed in the shaded region in the FIGURE. In view of this fact, it is considered that excellent SiC formation rate and erosion/corrosion resistance can be obtained at least in this region, i.e., a region where 100 mass % of the mixed powder consists of 51 to 74 mass % of ferro silicon nitride, 15 to 35 mass % of carbon black, and 10 to 30 mass % of roseki.

powder consists of 65 to 70 mass % of the silicon nitride-based material, 17 to 20 mass % of the carbon-based material, and 13 to 15 mass % of the roseki is more preferable.

In each of the samples Z, AV and AW plotted on the base of the triangular diagram in the FIGURE, the SiC formation rate is approximately zero. Heretofore, it has been believed as common technical knowledge of those skilled in the art that SiC bonds are formed only by a silicon nitride-based material and a carbon-based material according to the reaction formulas (1) and (2) disclosed in the Parent Document 1. However, in reality, against such common technical knowledge of those skilled in the art, it has been verified that SiC bonds are hardly formed without presence of roseki.

Table 5 shows respective compositions of taphole mixes according to inventive examples and comparative examples. The roseki B in Table 1 was used as roseki constituting the fine particle fraction. A particle size distribution of ferro silicon nitride, carbon black and roseki constituting the fine particle fraction in Table 5 is the same as that in Tables 2 to 4. Earthy graphite was formed using an earthy graphite powder size-controlled such that an average particle diameter thereof is 20 μm or less, and 85 mass % or more thereof belongs to a particle fraction having a particle diameter of 45 μm or less.

TABLE 5

| | | | Inventive Example 1 | Inventive Example 2 | Inventive Example 3 | Inventive Example 4 | Inventive Example 5 | Inventive Example 6 | Comparative Example 1 |
|---|---|---|---|---|---|---|---|---|---|
| Refractory Powder | coarse particle fraction and medium particle fraction | roseki (particle diameter of greater than 75 μm to 3 mm) | 15 | 15 | 15 | 15 | 10 | 15 | 15 |
| | | bauxite (particle diameter of greater than 75 μm to 3 mm) | 15 | 15 | 10 | 13 | 10 | 15 | 10 |
| | | silicon carbide (particle diameter of greater than 75 μm to 1 mm) | 15 | 10 | 10 | 10 | 4 | 15 | 12 |
| | | coke (particle diameter of greater than 75 μm to 0.5 mm) | 4 | 4 | 4 | 4 | 4 | 4 | 4 |
| | fine particle fraction (particle diameter of 75 μm or less) | silicon nitride-based material: ferro silicon nitride | 20 (61) | 35 (66) | 35 (60) | 35 (64) | 47 (68) | 14 (61) | 35 (69) |
| | | carbon-based material: carbon black | 7 (21) | 10 (19) | 12 } (26) | 10 (18) | 12 (17) | 5 (22) | 4 (8) |
| | | carbon-based material: earthy graphite | | | 3 } | | | | |
| | | roseki | 6 (18) | 8 (15) | 8 (14) | 10 (18) | 10 (14) | 4 (17) | 12 (24) |
| | | others: clay | 2.6 | 2.6 | 2.6 | 2.6 | 2.6 | 2.6 | 2.6 |
| | | bauxite | 5 | | | | | 10 | 5 |
| | | silicon carbide | 10 | | | | | 15 | |
| | | ferro silicon | 0.4 | 0.4 | 0.4 | 0.4 | 0.4 | 0.4 | 0.4 |
| | Tar (with respect to and in addition to 100 mass % of refractory powder) | | 15.3 | 15.5 | 15.7 | 15.7 | 16.1 | 15.0 | 15.0 |
| Test | wear index | | 100 | 80 | 77 | 78 | 82 | 115 | 90 |
| | drillability | | ○ | ○ | ◎ | ○ | ○ | ○ | X |

*A value indicated between ( ) in Table 5 is a relative ratio occupied in a total amount of 100 mass % of the silicon nitride-based material, the carbon-based material and the roseki constituting the fine particle fraction.

Among the samples A to Q, the samples G, H, J and L to P are particularly excellent in SiC formation rate. Thus, in the shaded region in the FIGURE, a region defined by the plots G, H, J and L to P, i.e., a region where 100 mass % of the mixed powder consists of 59 to 72 mass % of the silicon nitride-based material, 17 to 25 mass % of the carbon-based material, and 12 to 22 mass % of the roseki, is preferable. Further, it is considered that a region where 100 mass % of the mixed The test items in Table 5 will be described below.

The wear index was obtained in the following manner. Each of the taphole mixes in the inventive and comparative examples was subjected to pressure forming at 7 MPa, and burned in a reduction atmosphere at 400° C. The burned compact was used as a test piece. Then, each of the test pieces was eroded/corroded using blast-furnace slag as an erosive/corrosive agent at 1500° C. (corresponding to a temperature of a taphole mix during tapping) for 6 hours in a rotary erosion/corrosion tester, and a maximum dimension of wear was measured. Then, the maximum wear dimension of each of the test pieces was divided by the maximum wear dimension of the test piece for the taphole mix in the inventive example 1, and an obtained quotient was multiplied by 100 to obtain the wear index.

The drillability was evaluated in the following manner. Each of the taphole mixes was subjected to pressure forming at 7 MPa to have a columnar-shaped compact having a size of φ 50 mm×height 50 mm, and the compact was burned in a reduction atmosphere at 1200° C. (corresponding to a temperature of a taphole mix in a state when it is set to plug a taphole). The burned compact was used as a test piece. Each of the test pieces was bored in a heightwise direction thereof using a drill having a size of φ 10 mm, and an average penetration speed of the drill into the test sample during the boring was measured. A larger value of the average penetration speed indicates better drillability. When the average penetration speed of the drill was greater than 100 mm/min, the result was indicated by "double circle". When the average penetration speed of the drill was in the range of greater than 70 mm/min to 100 mm/min, the result was indicated by "○". When the average penetration speed of the drill was greater than 50 mm/min to 70 mm/min, the result was indicated by "Δ". When the average penetration speed of the drill was less than 50 mm/min, the result was indicated by "x". The taphole mix indicated by "Δ" or "x" in the evaluation of drillability is unsuitable for use in an actual blast furnace, because it takes too much time for a drilling operation.

In each of the taphole mixes in the inventive examples 1 to 6, a relative ratio among the silicon nitride-based material, the carbon-based material and the roseki meets the requirement defined in the appended claims, and exhibits excellent erosion/corrosion resistance. In addition, each of the taphole mixes in the inventive examples 1 to 6 also has excellent drillability.

Although the taphole mix in the inventive example 6 has sufficiently excellent erosion/corrosion resistance, it has a slightly high wear index as compared with the remaining taphole mixes in the inventive examples 1 to 5. This would primarily result from the fact that a ratio of the silicon nitride-based material occupied in the refractory powder is relatively small, i.e., 14 mass %. Considering that each of the inventive examples 1 to 5 where an amount of ferro silicon nitride occupied in the refractory powder is set to be 20 mass % or more is superior in terms of erosion/corrosion resistance to the inventive example 6, it can be said that the ratio of ferro silicon nitride occupied in the refractory powder is preferably set to be 20 mass % or more. However, in consideration of operating efficiency and drillability of the taphole mix, etc., the ratio of ferro silicon nitride occupied in the refractory powder is preferably set to be 50 mass % or less.

In the case where the ratio of ferro silicon nitride (having a particle diameter of 75 μm or less) occupied in the refractory powder is in the range of 20 to 50 mass %, if the relative ratio among the three components, in the sample O exhibiting the highest SiC formation rate in Table 2, is employed, a ratio of the carbon-based material (having a particle diameter of 75 μm or less) occupied in the refractory powder will be automatically set in the range of about 4.5 to 12.5 mass %, and, when it is more specified, set in the range of 4.8 to 12.2 mass %. Further, a ratio of the roseki (having a particle diameter of 75 μm or less) occupied in the refractory powder will be automatically set in the range of about 3.5 to 9.5 mass %, and, when it is more specified, set in the range of 3.7 to 9.3 mass %.

In the taphole mix in the comparative example 1, a relative ratio of the carbon-based material is excessively small, i.e., 8 mass %. Thus, the taphole mix in the comparative example 1 is incapable of efficiently forming SiC bonds. Moreover, the formation of silicon oxynitride bonds according to the reaction formula (3) is accelerated in a low temperature range of about 1200° C. or less, to cause significant deterioration in drillability, although the taphole mix in the comparative example 1 superficially exhibits an excellent characteristic in terms of erosion/corrosion resistance. Specifically, the erosion/corrosion resistance of the taphole mix in the comparative example 1 is not achieved by SiC bonds but mainly by silicon oxynitride bonds. Such a taphole mix is unsuitable for use in an actual blast furnace due to its poor drillability.

Table 6 shows respective compositions of taphole mixes according to other inventive examples and comparative examples. The roseki C in Table 1 was used as roseki constituting the fine particle fraction. A particle size distribution of ferro silicon nitride, carbon black and roseki constituting the fine particle fraction in Table 6 is the same as that in Tables 2 to 4. An evaluation method for each of the test items is the same as that in Table 5. The wear index is indicated by a relative value on an assumption that the wear index of the taphole mix in the inventive example 9 is 100.

TABLE 6

|  |  |  | Inventive Example 7 | Inventive Example 8 | Inventive Example 9 | Comparative Example 2 | Comparative Example 3 |
|---|---|---|---|---|---|---|---|
| Refractory Powder | coarse particle fraction and medium particle fraction | roseki (particle diameter of greater than 75 μm to 3 mm) | 10 | 10 | 10 | 10 | 10 |
|  |  | bauxite (particle diameter of greater than 75 μm to 3 mm) | 10 | 10 | 10 | 10 | 10 |
|  |  | silicon carbide (particle diameter of greater than 75 μm to 1 mm) | 10 | 10 | 10 | 10 | 10 |
|  |  | coke (particle diameter of greater than 75 μm to 0.5 mm) | 5 | 5 | 5 | 5 | 5 |
|  | fine particle fraction (particle diameter of 75 μm or less) | silicon nitride-based material — ferro silicon nitride | 40 (69) | 40 (69) | 40 (69) | 40 (69) | 40 (69) |
|  |  | carbon-based material — carbon black | 12 (20) | 10 (17) | 8.6 (15) | 8 (14) | 5.8 (10) |
|  |  | roseki | 8 (14) | 8 (14) | 8 (14) | 8 (14) | 8 (14) |
|  |  | others — bauxite | 5 | 7 | 8.4 | 9 | 11.2 |

TABLE 6-continued

|  |  | Inventive Example 7 | Inventive Example 8 | Inventive Example 9 | Comparative Example 2 | Comparative Example 3 |
|---|---|---|---|---|---|---|
|  | Tar (with respect to and in addition to 100 mass % of refractory powder) | 15.5 | 15.5 | 15.5 | 15.5 | 15.5 |
| Test | wear index | 91 | 97 | 100 | 100 | 106 |
|  | drillability | ◎ | ◎ | ○ | Δ | X |

* A value indicated between ( ) in Table 6 is a relative ratio occupied in a total amount of 100 mass % of the silicon nitride-based material, the carbon-based material and the roseki constituting the fine particle fraction.

As shown in Table 6, drillability becomes poorer as a relative ratio of carbon black is reduced. The reason is that, if the relative ratio of carbon black is small, silicon oxynitride bonds will be undesirably formed primarily in a low temperature range of about 1200° C. or less by a reaction between roseki and ferro silicon nitride. In view of the result in Table 6, a relative ratio of the carbon-based material should be 15 mass % or more in order to achieve excellent drillability. Unexpectedly, the value of 15 mass % conforms to a lower limit value of the relative ratio of the carbon-based material required for efficiently forming SiC bonds. That is, specifying the relative ratio of the carbon-based material contributes to not only the efficient formation of SiC bonds but also achievement of excellent drillability.

Table 7 shows respective compositions of taphole mixes according to other inventive examples and comparative examples. The roseki D in Table 1 was used as roseki constituting the fine particle fraction. A particle size distribution of ferro silicon nitride, carbon black and roseki constituting the fine particle fraction in Table 7 is the same as that in Tables 2 to 4. An evaluation method for each of the test items is the same as that in Table 5. The wear index is indicated by a relative value on an assumption that the wear index of the taphole mix in the inventive example 10 is 100.

As shown in Table 7, drillability becomes poorer as a mixing amount of boron carbide is increased. The reason is that boron carbide reacts with ferro silicon nitride in priority to an SiC bond-formation reaction among the three components, and thereby boron nitride bonds (BN) will be undesirably formed in a low temperature range of about 1200° C. or less. As shown in Table 7, boron carbide has an impact on drillability even if it is added in a tiny amount. The formation of boron nitride bonds can also occur when a boron compound-based material other than boron carbide is added. In view of the result in Table 7, a mixing amount of the boron compound-based material should be limited to less than 0.3 mass % with respect to 100 mass % of the silicon nitride-based material. Most preferably, the mixing amount of the boron compound-based material is zero mass %.

Table 8 shows respective compositions of taphole mixes according to other inventive examples and comparative examples. The roseki E in Table 1 was used as roseki constituting the fine particle fraction. A particle size distribution of ferro silicon nitride, carbon black and roseki constituting the fine particle fraction in Table 8 is the same as that in Tables 2 to 4. An evaluation method for each of the test items is the same as that in Table 5. The wear index is indicated by a

TABLE 7

|  |  |  |  | Inventive Example 10 | Inventive Example 11 | Comparative Example 4 | Comparative Example 5 |
|---|---|---|---|---|---|---|---|
| Refractory Powder | coarse particle fraction and medium particle fraction | roseki (particle diameter of greater than 75 μm to 3 mm) | | 15 | 15 | 15 | 15 |
|  |  | bauxite (particle diameter of greater than 75 μm to 3 mm) | | 10 | 10 | 10 | 10 |
|  |  | silicon carbide (particle diameter of greater than 75 μm to 1 mm) | | 10 | 10 | 10 | 10 |
|  |  | coke (particle diameter of greater than 75 μm to 0.5 mm) | | 4 | 4 | 4 | 4 |
|  | fine particle fraction (particle diameter of 75 μm or less) | silicon nitride-based material | ferro silicon nitride | 40 (69) | 40 (69) | 40 (69) | 40 (69) |
|  |  | carbon-based material | carbon black | 10 (17) | 10 (17) | 10 (17) | 10 (17) |
|  |  |  | roseki | 8 (14) | 8 (14) | 8 (14) | 8 (14) |
|  |  | others | bauxite | 2.96 | 2.92 | 2.9 | 1.8 |
|  |  |  | boron carbide | 0.04 ((0.1)) | 0.08 ((0.2)) | 0.1 ((0.3)) | 1.2 ((3)) |
| Tar (with respect to and in addition to 100 mass % of refractory powder) | | | | 15.5 | 15.5 | 15.5 | 15.5 |
| Test | | wear index | | 100 | 100 | 94 | 78 |
|  | | drillability | | ○ | ○ | X | X |

* A value indicated between ( ) in Table 7 is a relative ratio occupied in a total amount of 100 mass % of the silicon nitride-based material, the carbon-based material and the roseki constituting the fine particle fraction.
* A value indicated between (( )) in Table 7 is a ratio to an absolute amount of 100 mass % of the silicon nitride-based material constituting the fine particle fraction.

relative value on an assumption that the wear index of the taphole mix in the inventive example 12 is 100.

TABLE 8

|  |  |  | Inventive Example 12 | Inventive Example 13 | Inventive Example 14 | Comparative Example 6 | Comparative Example 7 |
|---|---|---|---|---|---|---|---|
| Refractory Powder | coarse particle fraction and medium particle fraction | roseki (particle diameter of greater than 75 μm to 3 mm) | 10 | 10 | 10 | 10 | 10 |
|  |  | bauxite (particle diameter of greater than 75 μm to 3 mm) | 10 | 10 | 10 | 10 | 10 |
|  |  | silicon carbide (particle diameter of greater than 75 μm to 1 mm) | 5 | 5 | 5 | 5 | 5 |
|  |  | coke (particle diameter of greater than 75 μm to 0.5 mm) | 4 | 4 | 4 | 4 | 4 |
|  | fine particle fraction (particle diameter of 75 μm or less) | silicon nitride-based material / ferro silicon nitride | 40 (59) | 41 (59) | 40 (59) | 40 (59) | 40 (59) |
|  |  | carbon-based material / carbon black | 20 (29) | 20 (29) | 20 (29) | 20 (29) | 20 (29) |
|  |  | others / roseki | 8 (12) | 8 (12) | 8 (12) | 8 (12) | 8 (12) |
|  |  | bauxite | 2.4 | 2 | 1.4 | 1 | 0.6 |
|  |  | metal silicon | 0.6 <3> | 1 <5> | 1.6 <8> | 2 <10> | 2.4 <12> |
|  | Tar (with respect to and in addition to 100 mass % of refractory powder) |  | 15.5 | 15.5 | 15.5 | 15.5 | 15.5 |
| Test | wear index |  | 100 | 100 | 96 | 88 | 90 |
|  | drillability |  | ◎ | ○ | ○ | Δ | X |

* A value indicated between ( ) in Table 8 is a relative ratio occupied in a total amount of 100 mass % of the silicon nitride-based material, the carbon-based material and the roseki constituting the fine particle fraction.
* A value indicated between < > in Table 8 is a ratio to an absolute amount of 100 mass % of the silicon nitride-based material constituting the fine particle fraction.

As shown in Table 8, drillability becomes poorer as a mixing amount of metal silicon is increased. The reason is that metal silicon reacts with carbon black in priority to the SiC bond-formation reaction among the three components, and thereby metal carbide bonds (in this case, SiC bonds) will be undesirably formed in a low temperature range of about 1200° C. or less. The formation of metal carbide bonds can also occur when a metal powder other than metal silicon is added. In view of the result in Table 8, a mixing amount of the metal powder should be limited to less than 10 mass % with respect to 100 mass % of the carbon-based material. Preferably, the mixing amount of the metal powder is limited to 8 mass % or less with respect to 100 mass % of the carbon-based material.

Although the present invention has been fully described based on a specific embodiment and examples, it is to be understood that various changes, modifications and combinations will be apparent to those skilled in the art.

Industrial Applicability

The taphole mix of the present invention is desirably used for plugging a taphole of a blast furnace. Further, the taphole mix of the present invention is widely usable not only for plugging a taphole of a blast furnace but also for plugging a molten metal taphole of an electric furnace, a waste melting furnace, or other intermittent tapping-type melting furnace.

The invention claimed is:

1. A taphole mix prepared by kneading with a binder a refractory powder size-controlled to include a fine particle fraction having a particle diameter of 75 μm or less, wherein the fine particle fraction is comprised of three components consisting of a silicon nitride-based material, a carbon-based material, and roseki, or comprised of the three component, and one or more selected from the group consisting of an alumina-based material, a silicon carbide-based material, a rare-earth element oxide-based material, clay, a high-purity silica-based material containing $SiO_2$ in an amount of 80 mass % or more, a boron compound-based material in an amount of less than 0.3 mass % with respect to 100 mass % of the silicon nitride-based material, and a metal powder in an amount of less than 10 mass % with respect to 100 mass % of the carbon-based material, and wherein a total amount of 100 mass % of the three components in the fine particle range consists of 51 to 74 mass % of the silicon nitride-based material, 15 to 35 mass % of the carbon-based material, and 10 to 30 mass % of the roseki.

2. The taphole mix as defined in claim 1, wherein each of the three components is size-controlled such that an average particle diameter thereof is 20 μm or less, and 85 mass % or more thereof belongs to a particle fraction having a particle diameter of 45 μm or less.

3. The taphole mix as defined in claim 1, wherein the silicon nitride-based material is ferro silicon nitride, and the carbon-based material is carbon black.

4. The taphole mix as defined in claim 1, wherein a ratio of the silicon nitride-based material occupied in the refractory powder is in the range of 20 to 50 mass %.

5. The taphole mix as defined in claim 1, wherein a ratio of the fine particle fraction occupied in the refractory powder is in the range of 45 to 75 mass %.

6. The taphole mix as defined in claim 2, wherein the silicon nitride-based material is ferro silicon nitride, and the carbon-based material is carbon black.

7. The taphole mix as defined in claim 6, wherein a ratio of the silicon nitride-based material occupied in the refractory powder is in the range of 20 to 50 mass %.

8. The taphole mix as defined in claim 7, wherein a ratio of the fine particle fraction occupied in the refractory powder is in the range of 45 to 75 mass %.

9. The taphole mix as defined in claim 2, wherein a ratio of the silicon nitride-based material occupied in the refractory powder is in the range of 20 to 50 mass %.

10. The taphole mix as defined in claim 9, wherein a ratio of the fine particle fraction occupied in the refractory powder is in the range of 45 to 75 mass %.

11. The taphole mix as defined in claim 3, wherein a ratio of the silicon nitride-based material occupied in the refractory powder is in the range of 20 to 50 mass %.

12. The taphole mix as defined in claim 11, wherein a ratio of the fine particle fraction occupied in the refractory powder is in the range of 45 to 75 mass %.

13. The taphole mix as defined in claim 2, wherein a ratio of the fine particle fraction occupied in the refractory powder is in the range of 45 to 75 mass %.

14. The taphole mix as defined in claim 3, wherein a ratio of the fine particle fraction occupied in the refractory powder is in the range of 45 to 75 mass %.

15. The taphole mix as defined in claim 4, wherein a ratio of the fine particle fraction occupied in the refractory powder is in the range of 45 to 75 mass %.

16. The taphole mix as defined in claim 6, wherein a ratio of the fine particle fraction occupied in the refractory powder is in the range of 45 to 75 mass %.

* * * * *